June 20, 1961 — I. M. WHITE — 2,989,282
IRRIGATION VALVE
Filed May 19, 1958 — 2 Sheets-Sheet 1
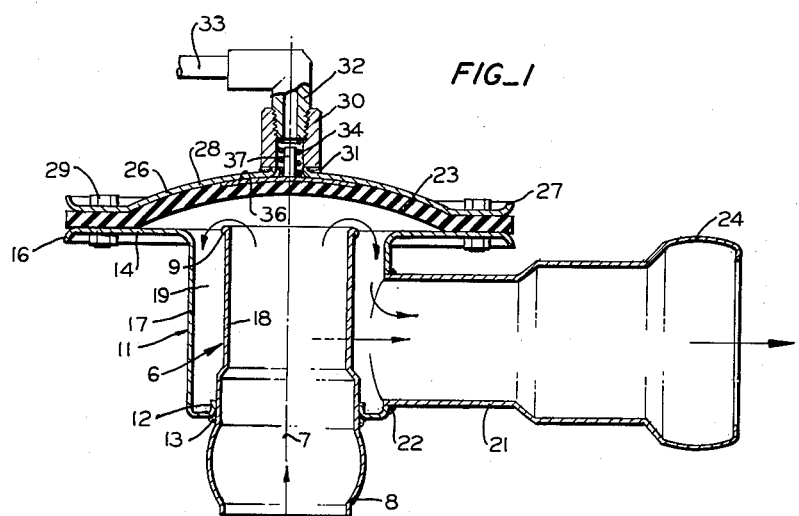
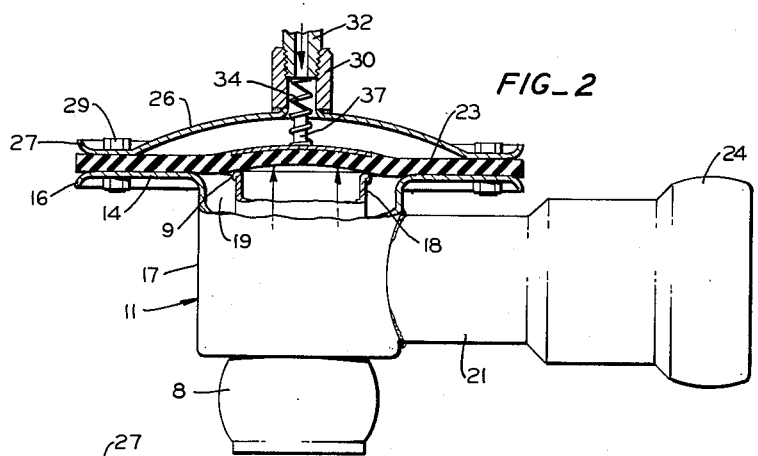
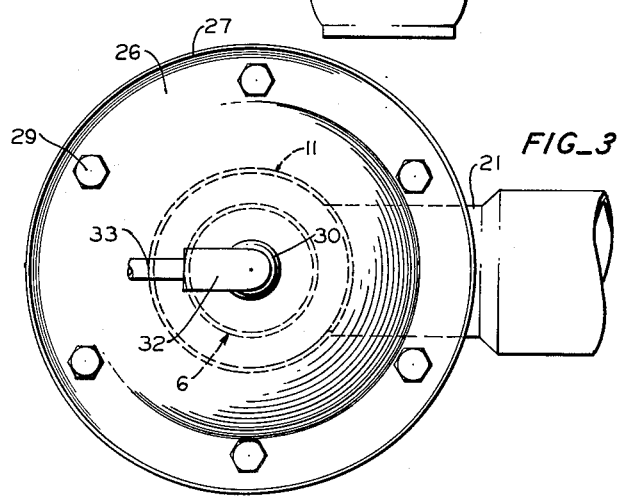
INVENTOR.
IRA MORGAN WHITE
BY Lothrop & West
ATTORNEYS June 20, 1961
I. M. WHITE
2,989,282
IRRIGATION VALVE
Filed May 19, 1958
2 Sheets-Sheet 2
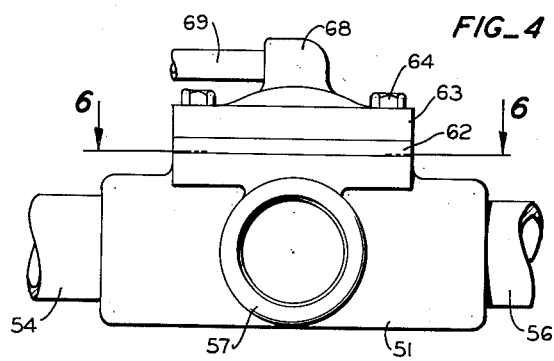
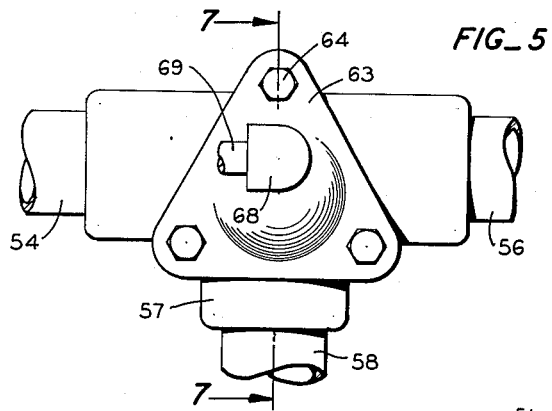
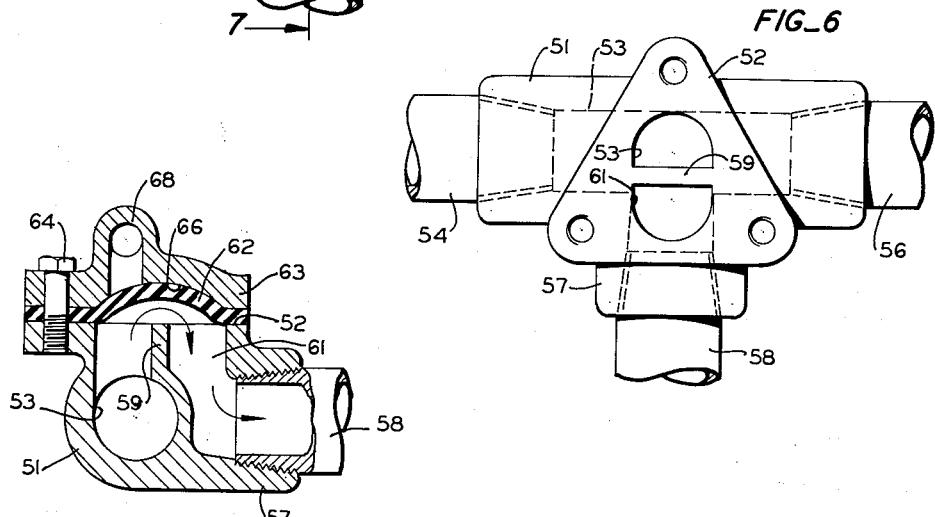
INVENTOR.
IRA MORGAN WHITE
BY *Lothrop & West*
ATTORNEYS ást # United States Patent Office 2,989,282
Patented June 20, 1961

2,989,282
IRRIGATION VALVE
Ira Morgan White, Berkeley, Calif., assignor to Baldwin-Lima-Hamilton Corporation, a corporation of Pennsylvania
Filed May 19, 1958, Ser. No. 736,346
1 Claim. (Cl. 251—61)

My invention relates to valves primarily for controlling a relatively large flow of water or the like under the influence of a small servo mechanism hydraulically operated. It is particularly useful in irrigation and sprinkling systems in which, while the quantity of water handled is fairly large, the pressure is relatively low.

It is an object of the invention to provide an irrigation valve which is simple in its construction and can operate for a protracted period without substantial deterioration, wear or service.

Another object of the invention is to provide an irrigation valve which can be easily and economically manufactured largely of simple or standard components.

Another object of the invention is to provide an irrigation valve which even in relatively large sizes is light, easily handled and readily transported.

A still further object of the invention is to provide an irrigation valve which, if necessary, can readily be disassembled, repaired, and assembled in the field with only ordinary tools and ordinary labor.

Other objects together with the foregoing are attained in the embodiments of the invention described in the accompanying description and illustrated in the accompanying drawings in which:

FIGURE 1 is a cross section on a central plane through one form of irrigation valve pursuant to the invention.

FIGURE 2 is a view similar to FIGURE 1 but showing the valve in a different operating position.

FIGURE 3 is a plan of the valve shown in FIGURES 1 and 2.

FIGURE 4 is a side elevation of a modified form of irrigation valve.

FIGURE 5 is a plan of the valve shown in FIGURE 4.

FIGURE 6 is a cross section, the plane of which is indicated by the line 6—6 of FIGURE 4.

FIGURE 7 is a cross section, the plane of which is indicated by the line 7—7 of FIGURE 5.

While the irrigation valve in accordance with the invention can be incorporated in a number of different ways depending somewhat upon the particular environment in which it is to be used, it has been successfully incorporated in the two forms shown herein, the first form (FIGURES 1 to 3 inclusive) being primarily for use in connection with large irrigation installations while the form shown in the other figures is especially designed for relatively small irrigation or sprinkling installations.

A general environment of this sort is shown in the co-pending application of William D. Crowe entitled, "Sequence Valve Controller for Hydraulic Circuits," filed May 19, 1958, with Ser. No. 736,277, now abandoned, and assigned to the assignee hereof. In the general installation there is provided mechanism for controlling the operation of individual ones of a group of valves by means of a hydraulic servo system.

As this is embodied in the device of FIGURES 1 to 3 inclusive, there is preferably provided a central inlet conduit 6 symmetrically disposed about a central axis 7 and preferably fabricated of light sheet material. One end of the conduit has a bulbar formation 8 of a recognized kind for the reception of a similarly constituted coupling. At its upper end the inlet conduit 6 is preferably smoothed or provided with a peripheral bead 9 so that a relatively broad, rounded terminus is formed.

Concentric with the axis 7 and largely surrounding the inlet conduit 6 is a valve body 11 likewise fabricated of relatively light sheet material. At its lower end this has an in-turned flange 12 and is secured to the conduit 6 by a ring of welding 13. The upper portion of the housing 11 is formed into an out-turned flange 14 with a terminal down-turned rim 16. The flange 14 is substantially planar and its plane is approximately normal to the axis 7 at an elevation below the plane of the bead 9. The outer wall 17 of the housing 11 is cylindrical and is spaced from the adjacent cylindrical wall 18 of the inlet conduit 6 a sufficient amount to leave an annular passage 19 therebetween.

Merging with the housing 11 is an outlet pipe 21 of substantially standard form secured to the body of the valve by a ring of welding 22. The outlet conduit ends in a bell 24 adapted to cooperate with a coupling substantially of the same sort as the standard coupling 8.

Resting on the flange 14 and overlying the body of the valve and thus overlying what in effect is the port defined by the inlet conduit 6 and the port defined by the upper part of the annular passage 19 is a flexible diaphragm 23. This diaphragm is preferably such as to be impervious to water and conveniently is of rubber with or without fabric reinforcement. The size of the diaphragm is such that it overlies the entire flange 14 and when unstressed or substantially unstressed is approximately flat.

Overlying the diaphragm is an upper housing 26 conveniently made of a relatively thin sheet having an upwardly flanged rim 27 and also including an upwardly displaced portion 28 to provide a dome-shaped recess in the upper housing. A ring of fasteners 29 passes through the upper housing, the diaphragm and the flange 14 in order to hold all of those parts together. When the fastenings are removed the parts are completely loose and can readily be separated.

The top of the upper housing in its central portion is provided with a hollow boss 30 secured in position by a line of welding 31 and formed to receive a standard elbow 32 into which a pressure control conduit 33 extends. A coil spring 34 is disposed within the boss 30 and at one end abuts the fitting 32. At the other end the spring 34 rests against a disc 36 having a slight curvature so as to rest properly against the deformed diaphragm and to rest also against the nether portion of the upper housing 26. A stem 37 is secured to the disc, serving partly as a guide for the spring 34 and so that it is itself guided within the boss 30.

In the operation of this device, the inlet 8 is connected to a source of fluid under pressure and the conduit 33 is connected to a controlled source of pressure fluid. When the fluid in the conduit 33 is not exerting pressure upon the diaphragm 23, the parts are substantially in the position shown in FIGURE 1. The pressure within the inlet conduit 6 acting on the underside of the diaphragm 23 lifts the diaphragm until it and the disc 36 come into substantial contact with the nether side of the upper housing thus displacing fluid previously in that portion of the housing and likewise compressing the spring 34. This displacement of the diaphragm leaves a clear passage from the interior of the inlet duct 6 around the bead 9 at the upper edge of the inlet duct and through the annular passageway 19 into the outlet pipe 21 for discharge. Thus when there is no pressure or no sufficient pressure within the pipe 33, there is full flow from the inlet conduit 6 to the outlet pipe 21.

When pressure of sufficient amount is imposed through the conduit 33 and the fitting 32, that pressure is effective to displace the diaphragm 23 into the position shown in FIGURE 2. Often the pressure per unit area is the same in the fitting 32 as it is within the inlet conduit 6 but since the diaphragm has a sufficient top area, the total pressure thereon is approximately sufficient to produce diaphragm displacement into the FIGURE 2 position. This movement of the diaphragm is augmented by the expansion of the spring 34, the urgency thereof being transmitted through the disc 36. This is of substantially the outer diameter of the beaded edge 9. Consequently, the diaphragm 23 is not only urged downwardly to lie in contact with the flange 14 and is not only pressed hydraulically against the bead edge 9 but also the closing force is augmented by that of the spring 34 acting through the disc 36 and directly upon the bead edge 9 so that the diaphragm is tightly pinched and affords a tight shut-off. In this position of the diaphragm efflux from the inlet conduit 6 into annular space 19 is cut off so that there is no flow between the inlet conduit 6 and the outlet pipe 21.

A position of the diaphragm intermediate these two extreme positions can be effectuated by a corresponding intermediate pressure within the conduit 33. Thus by varying the pressure within the conduit 33 the valve is either opened, or closed, or held in an intermediate position.

In the smaller form of device shown in FIGURES 4 to 7 there is provided a lower housing 51 in this instance preferably a casting terminating in a substantially planar upper face 52. Within the casting is formed an inlet duct 53 served by conduits 54 and 56 and there is also provided an outlet conduit 57 served by a pipe 58. The inlet duct 53 terminates at the surface 52 to provide an inlet port divided by an intervening wall 59 from a similarly terminated outlet duct 61.

Overlying the inlet and outlet ducts and also lying against the surface 52 is a diaphragm 62 substantially coextensive with the surface 52 and preferably made of rubber with or without fabric reinforcement. Above the diaphragm is an upper housing 63 also preferably made by casting and held in position by fasteners 64 which pass through the upper housing and the diaphragm and threadedly engage the lower housing.

The upper housing is contoured to provide a recess 66 of a partially spherical form substantially symmetrically situated above the ports for the inlet duct 53 and the outlet duct 61. A fitting 68 is formed integrally with the upper housing 63 and communicates with the recess 66 above the diaphragm. The integral fitting 68 is served by a pressure servo pipe 69 leading to a controlled source of pressure liquid.

When the conduits 54 and 56 are connected to a source of fluid under pressure and when the conduit 69 is connected to a low pressure drain, the pressure within the inlet duct 53 acting at the inlet port is sufficient to lift the diaphragm 62 substantially into the position shown in FIGURE 7 in which the diaphragm rests against the wall of the recess 66 and is spaced away from the face 52 so that a path for free flow is afforded between the inlet duct 53 and the outlet pipe 58.

When pressure liquid is admitted through the pipe 69 and the integral fitting 68 to the volume above the diaphragm 62, the unit pressure of such fluid acting over the total upper area of the diaphragm is sufficient to force the previously distorted diaphragm back into its substantially planar location overlying and blocking the ports opening into the face 52. Since any upward pressure due to the inlet 53 acts over only a relatively small diaphragm area whereas the closing pressure acts over substantially the entire upper part of the diaphragm, there is provided a servo closure which keeps the diaphragm overlying the bridge 59 and blocking the outlet port 61 so that no flow can occur.

When the pressure within the conduit 69 is at an intermediate value the diaphragm 62 is correspondingly moved to an intermediate location thus providing a partially throttled flow.

In both forms of device there is afforded a very simple mechanism effective to give a sharp cut-off in the fluid flow or to open substantially without difficulty into maximum position. The device is operable through a servo mechanism requiring very little flow for the amount of fluid flowing through the valve. In both forms of the device there is a relatively light, sturdy, straightforward design capable of being repaired with simple tools by unskilled people and therefore constituting a substantial improvement.

What is claimed is:

An irrigation valve comprising a central tube of uniform wall thickness having a connector formation at its lower end and an enlarged bead disposed in a plane at its upper end, a surrounding member of uniform wall thickness and at its lower end in-turned and secured to said central tube above said connector formation and at its upper end having an outturned planar first circular flange substantially in said plane, a connector of uniform wall thickness secured to said member and therewith defining a flow passage, an imperforate flexible circular diaphragm of uniform thickness abutting said first flange and movable into and away from abutment with said bead, a cap of uniform wall thickness adjacent its center being substantially spaced from said bead, said cap having a planar second circular flange overlying the outer part of said first flange and said diaphragm and having a central, uniformly curved dome overlying the remaining part of said first flange and said diaphragm, means for securing said cap to said first flange with said diaphragm clamped between said first flange and said second flange to provide a pressure tight enclosure, means including a single conduit fitting centrally disposed on said cap for subjecting the interior of said cap to selected pressures and a spring abutting said fitting and said diaphragm for urging said diaphragm toward said bead.

References Cited in the file of this patent

UNITED STATES PATENTS

| 430,226 | Easton | June 17, 1890 |
| 925,538 | Weaver | June 22, 1909 |
| 1,496,935 | Lemmon | June 10, 1924 |
| 2,648,351 | Curtis | Aug. 11, 1953 |
| 2,811,169 | Buchanan | Oct. 29, 1957 |
| 2,838,269 | Hunter | June 10, 1958 |

FOREIGN PATENTS

| 11,362 | Germany | of 1880 |
| 656,585 | Great Britain | Aug. 29, 1951 |